Figure 1:
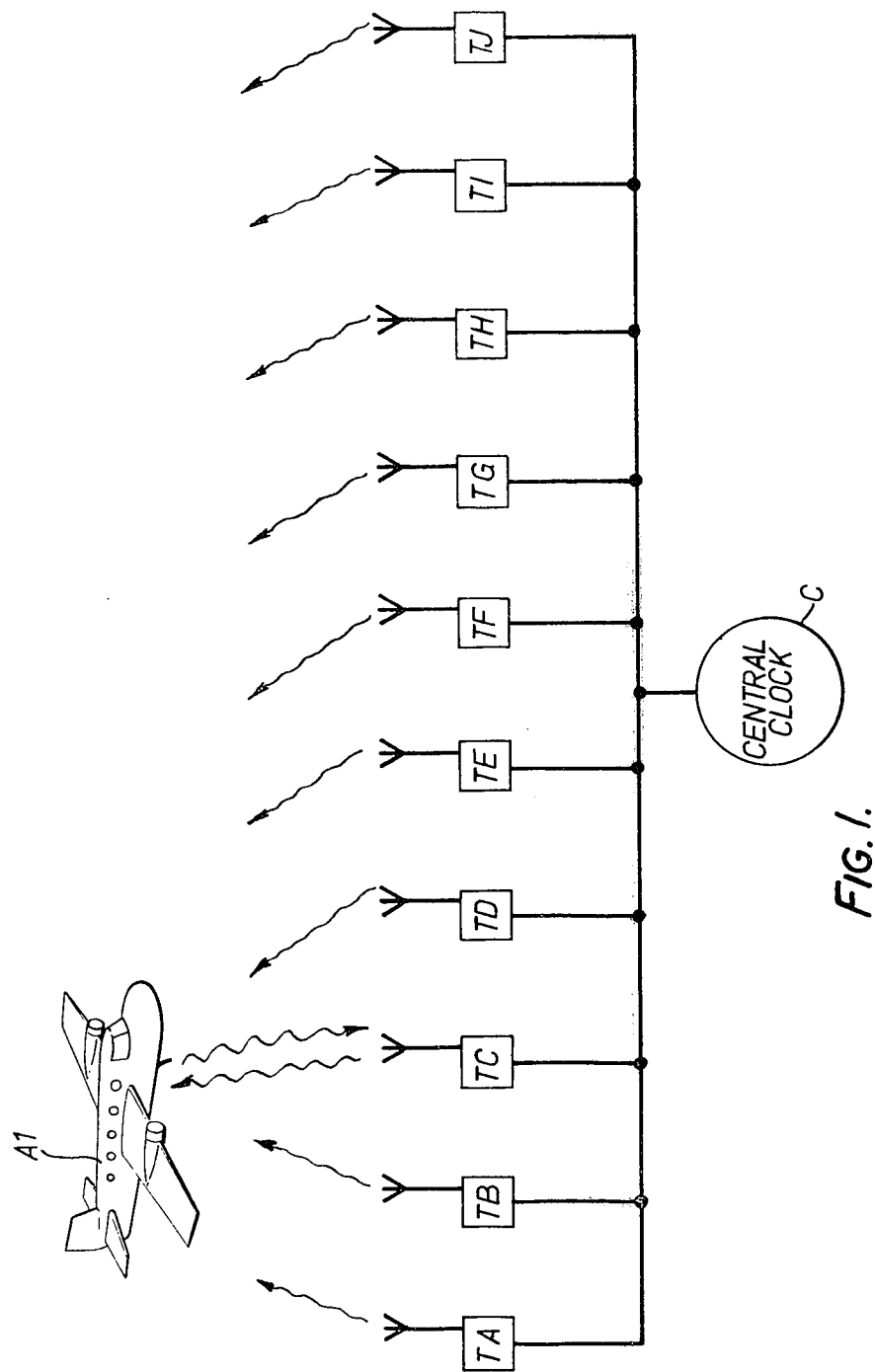

United States Patent [19]

Pudsey

[11] 3,943,509

[45] Mar. 9, 1976

[54] NAVIGATION AIDING SYSTEMS WITH ONE-WAY RANGING AND TWO-WAY SYNCHRONIZATION

[75] Inventor: David Graham Pudsey, Rayleigh, England

[73] Assignee: Elliott Brothers (London) Limited, London, England

[22] Filed: Mar. 9, 1973

[21] Appl. No.: 339,585

[30] Foreign Application Priority Data
Mar. 9, 1972   United Kingdom............... 10915/72

[52] U.S. Cl................ 343/6.5 R; 343/5 LS; 343/7.5
[51] Int. Cl.²............................................ G01S 9/56
[58] Field of Search.......... 343/6.5 LC, 6.5 R, 5 LS, 343/7.5

[56] References Cited
UNITED STATES PATENTS

| 2,536,496 | 1/1951 | Falloon............................ 343/5 LS |
|---|---|---|
| 3,119,107 | 1/1964 | Maresca........................... 343/6.5 R |
| 3,262,111 | 7/1966 | Graham .............................. 343/7.5 |
| 3,336,591 | 8/1967 | Michnik et al. ............... 343/6.5 LC |
| 3,412,399 | 11/1968 | Chisholm....................... 343/6.5 LC |
| 3,594,799 | 7/1971 | Michnik......................... 343/6.5 LC |
| 3,662,391 | 5/1972 | Brown............................... 343/5 LS |

*Primary Examiner*—Maynard R. Wilbur
*Assistant Examiner*—G. E. Montone
*Attorney, Agent, or Firm*—Baldwin, Wight & Brown

[57] ABSTRACT

A navigation aiding system primarily for aircraft consists of a number of spaced apart ground stations. A ranging signal is transmitted to each of a number of aircraft in turn in response to received interrogation signals. The system allows a clock carried by each aircraft to be accurately synchronised with a master clock on the ground to permit the range to be measured precisely.

11 Claims, 8 Drawing Figures

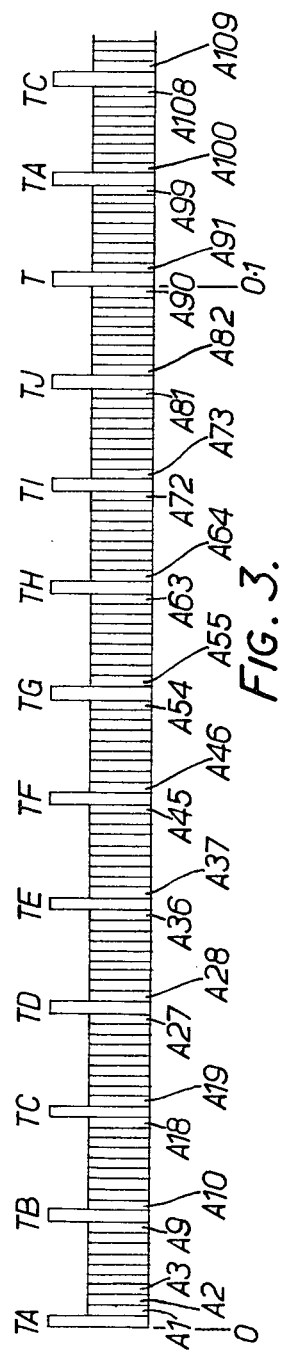
FIG. 3.
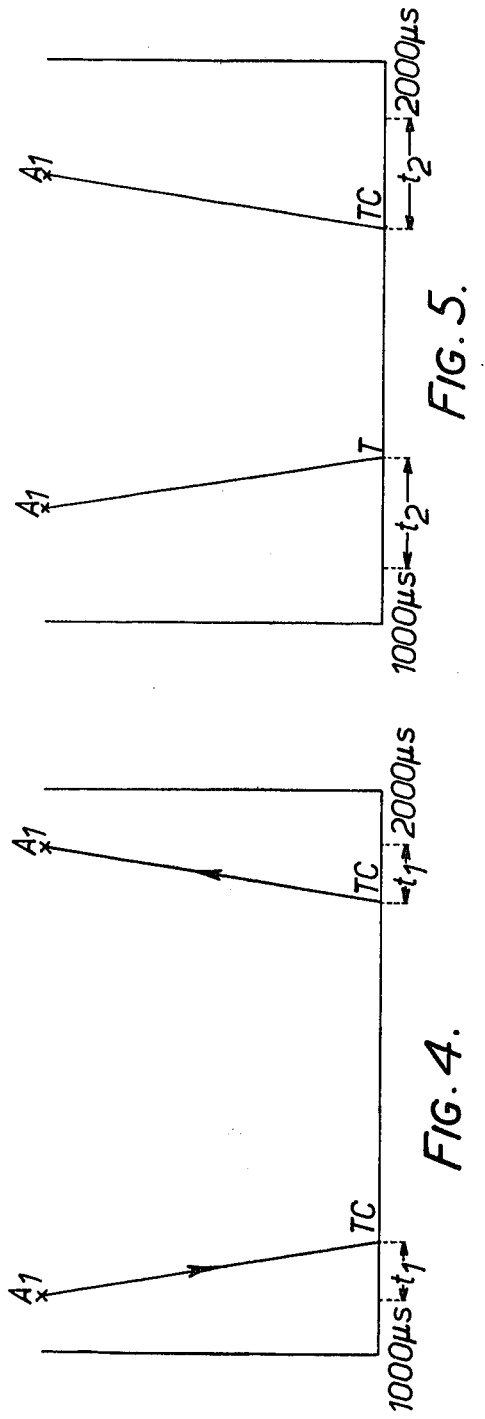
FIG. 4.
FIG. 5.

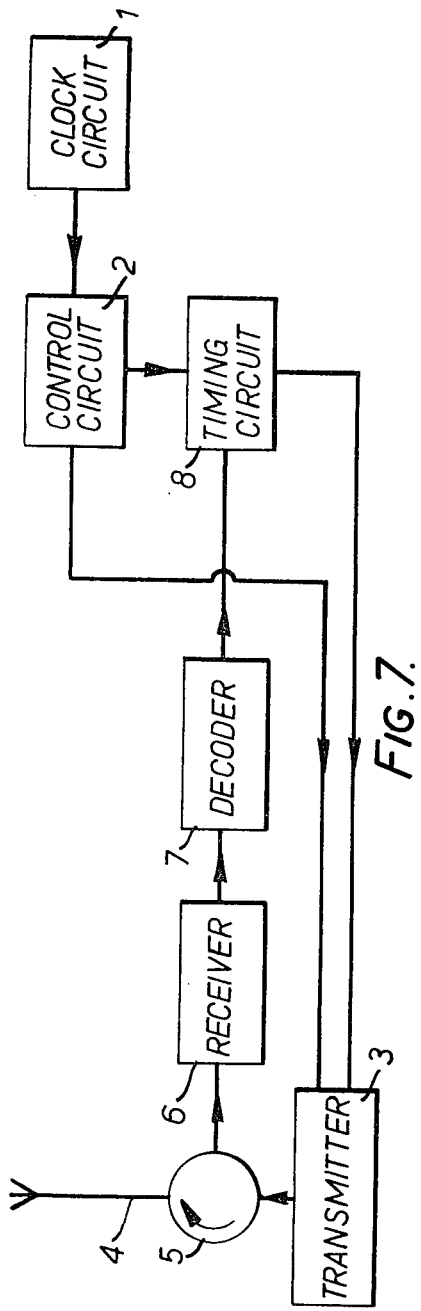
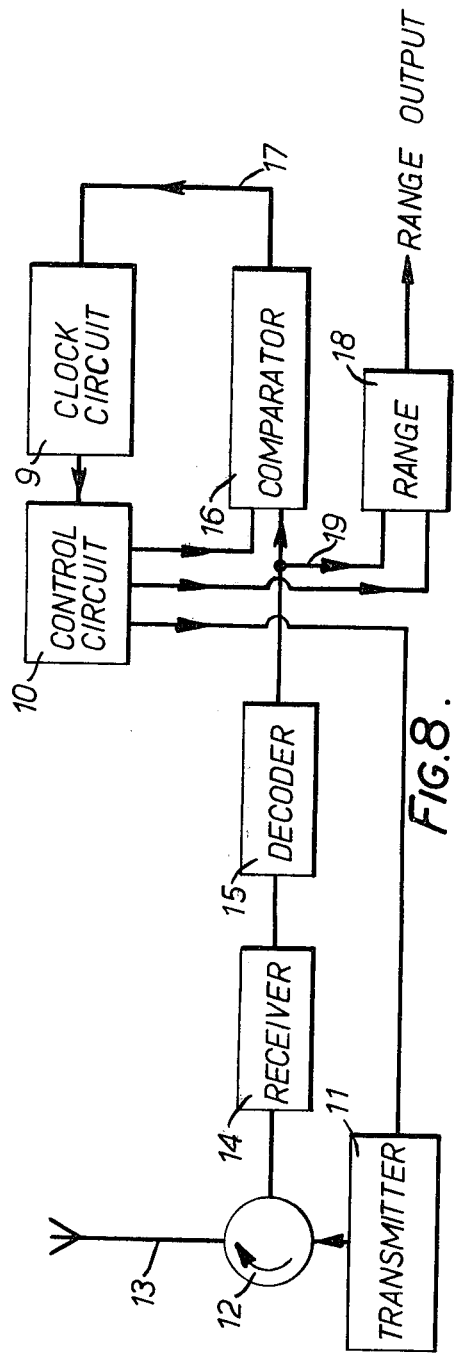

NAVIGATION AIDING SYSTEMS WITH ONE-WAY RANGING AND TWO-WAY SYNCHRONIZATION

This invention relates to navigation aiding systems and more particularly to such systems for use in the assistance of aircraft landing.

There are in existence a number of navigation aiding systems used to assist in the landing of aircraft. One function of such systems is to indicate to the aircraft its range from a beacon sited near a runway on which the aircraft is to land. One well known ranging system is that known as D.M.E.

In the D.M.E. system an aircraft wishing to determine its range from a beacon transmits to the ground beacon a pair of pulses of fixed separation. A predetermined short period of time following the receipt by the ground beacon of this pair of pulses, the ground beacon transmits a pair of pulses, similarly separated, the time of receipt of which by the aircraft following the aircraft's transmission being indicative of the range of the aircraft from the beacon in question. For obvious reasons systems such as the D.M.E. system are known as "two way" ranging systems.

The degree of precision provided by such systems is limited by the presence of replies to each aircraft being received by all aircraft which results in the necessity for each aircraft to transmit at intervals in the order of 0.02 second in order to obtain an effective information rate of 0.1 second.

Improvements in accuracy can be made by allocating each aircraft a time slot at 0.1 second intervals during which only that aircraft transmits and the beacon replies with both a ranging pulse and a synchronising pulse to enable aircraft to remain synchronised to the system. This results in service to even fewer aircraft than the random system due to the limited number of available slots. With an increasing number of aircraft using the air space surrounding an airfield such two way ranging systems are proving inadequate because of the limited number of aircraft which may associate with the system at any one time.

Single way ranging systems, that is to say ranging systems in which each aircraft carries a clock are attractive in view of the increased number of aircraft which may co-operate with the system as compared with a two way ranging system.

The basic conception of single way ranging is that a ground beacon transmits pulses at known times so that any aircraft equipped with a sufficiently accurate clock may measure the delay in received pulses and thus deduce the range.

It is only necessary for the beacon to transmit at intervals of 0.1 second in order to provide an adequate data rate for precision landing purposes. However, it is difficult to provide an airborne time standard clock of adequate integrity. For example it is not uncommon to require in a ranging system a resolution of 0.001 nautical miles (i.e. 6 ft.). For a one way system this corresponds to a time period of approximately 6 NANO seconds. An airborne time standard clock should have a deviation no greater than this. Crystal oscillators are known which have an accuracy of $1 \times 10^{-8}$ which will hold to 6 NANO seconds over 0.6 seconds, whilst precision frequency source such as atomic clocks, having an accuracy $2 \times 10^{-11}$ are still only capable of holding to 6 NANO seconds over approximately 5 minutes. A crystal oscillator of $1 \times 10^{-8}$ accuracy can, however, be improved to an accuracy of $1 \times 10^{-9}$ by synchronisation by a ground transmitter and will thus maintain the required standard of accuracy for up to 6 seconds. Whatever form of clock is used, however, it will be seen that continual synchronisation of the airborne time standard clock is necessary at a rate depending upon the stability and the integrity required.

The present invention seeks to provide an improved navigation aiding system providing one way ranging, albeit with two way synchronisation, in which satisfactory synchronising of the time standard clocks carried by craft associating with the system may be achieved.

According to this invention a navigation aiding system comprises a plurality of relatively fixed stations each arranged to transmit at predetermined times identifiable ranging signals to craft associating with the system and means responsive to an interrogating signala received from a craft for transmitting time synchronising signals to that craft, whereby the time of reception by said craft of signals from any of the said fixed stations is indicative of the range of that craft from that station, each craft being allocated one of a plurality of time slots interspersed between ranging signal transmissions by said fixed stations for transmitting its interrogating signal and receiving time synchronising signals transmitted to it.

Preferably each of said identifiable ranging signals comprises a pair of pulses whose separation identifies the fixed station by which they are transmitted.

Preferably means responsive to interrogating signals from a craft for transmitting time synchronising signals to that craft are provided at each relatively fixed station, whereby said craft may select which of said fixed stations it utilises to obtain time synchronising signals by transmitting an interrogating signal identifiable by the selected fixed station as relating to itself.

Different frequencies may be used for interrogating signals intended for different fixed stations, but preferably each interrogating signal transmitted by craft consists of a pair of pulses, the separation of which identifies the fixed station for which it is intended.

Where the spacing of the different ground stations from each other is such that time slot overlap can occur, that is to say if the transmission of one of the plurality of stations can be received by an aircraft in a later time slot due to its range, different ones of the plurality of fixed stations may be allocated different frequencies on which to operate so as to enable such spurious receptions to be differentiated. In such a case, preferably again the interrogating signal transmitted by each aircraft consists of a pair of pulses the separation of which and the frequency of transmission of which identifies the station for which it is intended.

Preferably again in response to the receipt of a pair of pulses, each ground station is arranged to transmit within the time slot allocated to the craft transmitting said pair of said interrogating pulses, synchronising pairs of pulses of similar station identifying characteristics.

In a preferred system in accordance with the present invention the plurality of relatively fixed stations are arranged to transmit ranging signals sequentially and in turn at equally spaced periods of time, there being a number of time slots allocated to craft co-operating with the system such that each fixed station transmits a plurality of times, in its turn, in an epoch.

By epoch is meant the period of time occupied by a complete cycle in the operation of the system encompassing one synchronising time slot for each of the craft associating with the system.

Preferably said craft are aircraft and said system an aircraft landing system.

Figure 2:
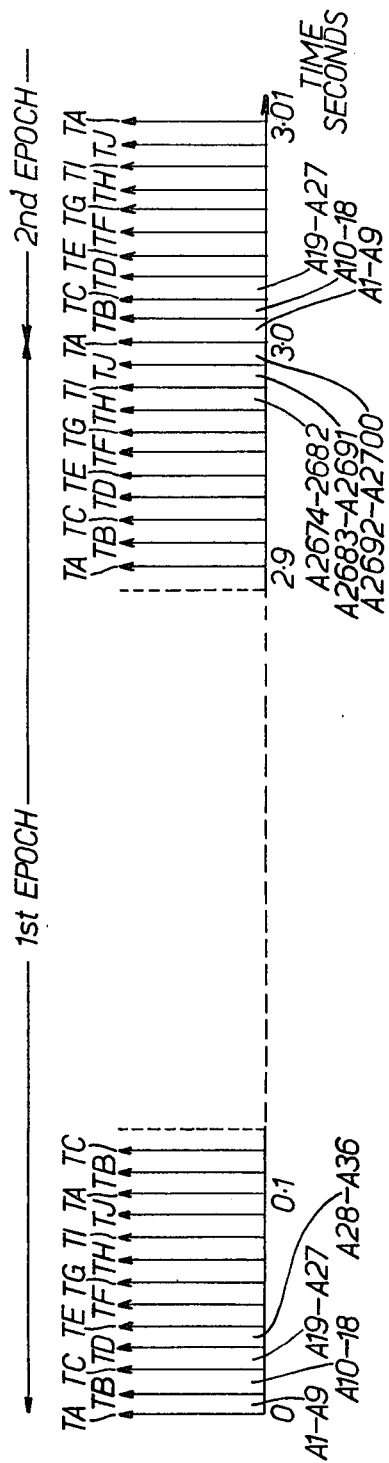
Figure 6:
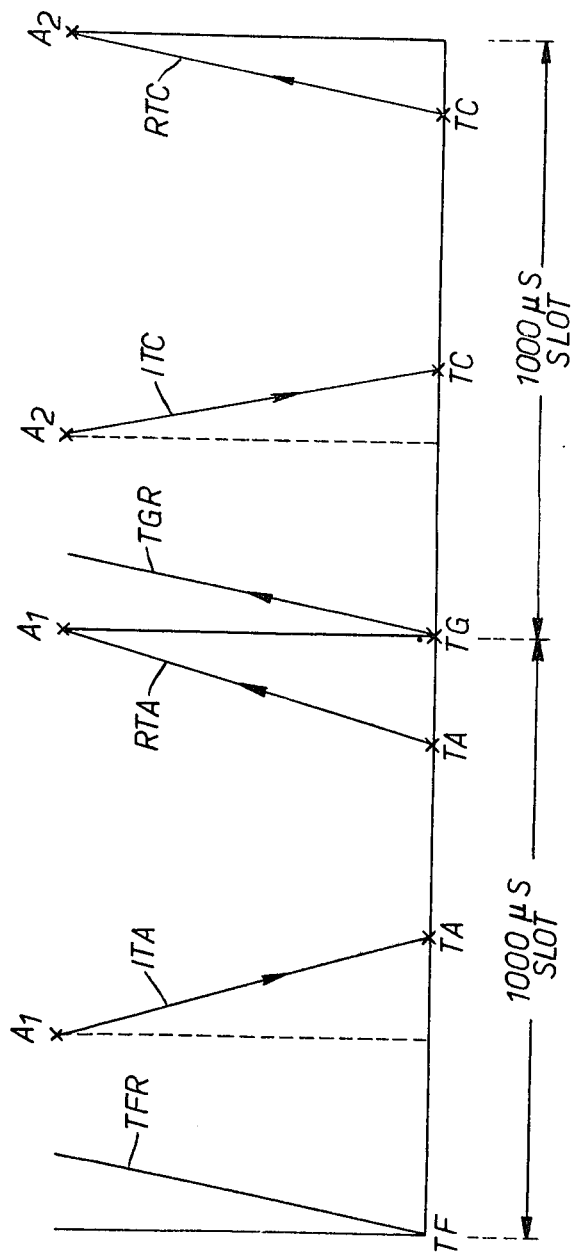

The invention is illustrated in and further described with reference to the accompanying drawings. In the drawings:

FIG. 1 is a highly schematic diagram of one aircraft navigation aiding system in accordance with the present invention, FIGS. 2 and 3 are timing diagrams, FIG. 3 being to an expanded scale compared with FIG. 2, FIGS. 4 and 5 are timing diagrams each to an expanded scale compared with FIG. 3, illustrating the arrangement for synchronising the time standard clock carried by each aircraft associating with the system, FIG. 6 is a timing diagram to an expanded scale compared with FIG. 3, illustrating one alternative to the timing arrangement illustrated in FIGS. 2 to 5, FIG. 7 is a block schematic diagram of a ground transponder station co-operating in a system in accordance with the present invention and FIG. 8 is a block schematic diagram of an airborne interrogating equipment co-operating in a system in accordance with the present invention.

Referring to FIG. 1 of the drawings, 10 geographically spaced ground transmitting stations TA, TB, TC, TD, TE, TF, TG, TH, TI and TJ are arranged to transmit identifiable ranging signals on a common frequency sequentially and in turn at intervals of one tenth of a second. The transmitting stations TA to TJ are synchronised by a central clock C. The signals transmitted by each of the ground stations TA to TJ are in the form of a pair of pulses, the spacing of which is different for each ground station and thus identifies that ground station to an aircraft such as A1 receiving the transmissions. Carried by each aircraft such as A1 is a time standard clock consisting of a crystal oscillator whose time standard is synchronised to the time standard of the ground stations TA to TJ in a manner described hereafter. Airborne equipment of known kind can thus determine the range of the aircraft in which it is carried from any of the ground stations by the time of receipt of the pair of pulses transmitted by that ground station.

In order to achieve synchronisation of the time standard clock carried by each aircraft associating with the equipment, each such aircraft is allocated a different time slot in an epoch of duration three seconds, during which time slot the aircraft requests and obtains synchronising timing signals. Whilst the allocation of a given time slot to a given aircraft may be predetermined, in practice allocation is made as known per se as the aircraft joins the system. The synchronising timing signals are provided by means at each of the ground stations TA to TJ. Each of the means at the different ground stations for providing synchronising signals is triggered upon receipt of a pair of spaced pulses, the separation of which identifies the ground station for which it is intended. This pair of pulses is transmitted by an aircraft within the time slot allocated to it.

Referring to FIGS. 4 and 5, for the purposes of illustration it is assumed that aircraft A1 requires synchronising signals from ground station TC. At a predetermined time (100 $\mu$S in the example presently considered) into what the aircraft considers to be its time slot, the aircraft transmits a pair of pulses whose separation identifies the pair as intended for ground station TC. This is illustrated in FIG. 4 which assumes correct synchronisation. Ground station TC receives the pair of pulses at a time (say 100 $\mu$S) later depending on range. Ground station TC computes the time difference $t_1$ between when it expects the aircraft A1 to have transmitted and the time of reception of the transmitted pair of pulses. A predetermined time again (100 $\mu$S) in the example presently considered) before the end of the time slot aircraft A1 is due to receive a response from ground station TC. At a time prior to this by a period equal to time difference $t_1$, ground station TC transmits the response. Upon receipt of the response by aircraft A1 at the expected time, the aircraft is assured that it is correctly synchronised with ground station TC.

If on the other hand the clock in aircraft A1 is in error the response received by the aircraft will be early if its clock is slow and late if its clock is fast to an extent dependent upon the extent of the error. FIG. 5 assumes that the aircraft clock is slow by 100 $\mu$S. The transmission by the aircraft then occurs 200 $\mu$S into its time slot. Ground station computes the time difference $t_2$ between when it expects the aircraft to have transmitted and the time of reception of the transmitted pair of pulses. At a time prior to the aforementioned predetermined time when the aircraft is due to receive a response from station TC, station TC transmits its response. This will be received by the aircraft A1 at a time earlier than expected by a time period equal to twice the extent by which its clock is slow. The aircraft is then enabled to adjust its clock to achieve synchronism with ground station TC. Three seconds later a time slot is again available to aircraft A1 during which the synchronising procedure outline above is repeated. Having thus achieved synchronisation of the time standard clock carried by the aircraft with the time standard of the ground stations, each transmission of ranging signals by the different ground stations may be used to indicate the range of the aircraft from the particular ground station.

The timing of the whole system will be understood from FIGS. 2 and 3. An epoch of duration 3 seconds is divided into 1,000 $\mu$S slots. Each slot is shown in FIG. 3 which is to a scale greater than FIG. 2. The first time slot is allocated to the transmission of ranging information by ground station TA. The following nine time slots are allocated each to one of nine different aircraft A1 to A9 for the purpose of achieving synchronisation as outlined above. The next time slot is allocated to the transmission of ranging signals by ground station TB, whilst the next nine time slots are allocated each to one of nine different aircraft A10 to A18 for obtaining synchronisation as outlined above. The next time slot is allocated to the transmission of ranging information by ground station TC . . . and so on. A complete epoch of three seconds is shown in FIG. 2, during which time each ground station transmits ranging signals in its turn on 30 occasions. On the first occasion each ground station transmits ranging signals in an epoch, in addition it transmits a short ground station identifying signal (not represented in FIGS. 2 and 3) to define the position of its ranging signal transmissions in the epoch. Interspersed between the transmission at every one tenth of a second of the ground stations TA to TJ are the 2700 time slots allocated to 2700 different aircraft A1 to A2700 associating with the system. Thus in the system described by way of example here 2700 aircraft may associate with the system at any one time.

Although ideally the system services 270 different aircraft from each beacon, theoretically all 2700 aircraft could operate on any one. The performance of the system is largely independent of the number of aircraft obtaining service.

Each aircraft may obtain range from all beacons within range of a system, thus obtaining information enabling it to obtain its position in space if at least three are available.

As all aircraft interrogations are available at all beacons within range, the ground system may compute position in space of each aircraft.

Slots may be allocated more frequently for ranging purposes if required, i.e. the ranging interval may be halved from 0.1 secs. to 0.05 secs. causing a reduction from 2700 to 2400 in the number of aircraft which can obtain service.

As will be appreciated since all of the aircraft associating with the system are time synchronised equipment may be provided in each aircraft for measuring the range of itself from any of the other aircraft associating with the system. In other words, the present system is capable of providing a collision avoidance system (CAS). As with known CAS systems if one of the two pulses transmitted by each aircraft is longer, Doppler effect may be used in one aircraft to indicate the closing velocity of that aircraft and any other associating in the system.

During the time slot allocated to each aircraft it will be understood that information such as height or aircraft identification may be transmitted by the aircraft to the ground system and vice versa.

As has already been mentioned the ground stations in the system are geographically spaced. In order to cover an extended territory, further adjacent systems may be provided on further frequency channels.

Referring to FIG. 6, this illustrates an alternative timing arrangement which may be used to advantage in some cases. In this case the epoch is again divided into a plurality of 1000 micro second time slots and again the transmitters TA to TJ transmit sequentially and in turn ranging signals, whilst synchronisation is effected between ranging signal transmissions. In this case, however, ground station TA transmits ranging signals during the first third of a first time slot, ground station TB transmits ranging signals during the first third of the next following 1000 micro second time slot — and so forth.

An aircraft, $A_1$ in FIG. 6, wishing to synchronise itself with ground station TA transmits an interrogating signal to ground station TA at the end of the first third of the time slot allocated to that aircraft. At the beginning of this time slot one of the ground stations TA to TJ will have transmitted its ranging signal. For purposes of illustration it is assumed that this is ground station TF. Similarly an aircraft, $A_2$ in FIG. 6, wishing to synchronise itself with another ground station, in this case TC say, transmits an interrogating signal to ground station TC, after the end of the first third of the time slot allocated to the aircraft $A_2$. At the beginning of this last mentioned time slot, ground station TG will, of course, have transmitted its ranging signal.

Ground station TA transmits synchronising signals to aircraft $A_1$ at a time such that the transmissions are received by aircraft $A_1$ 100 $\mu$ seconds before the end of the synchronising time slot allocated to aircraft $A_1$.

The transmission of synchronising signals by the ground station TC to the aircraft $A_2$ is similarly arranged.

In FIG. 6, ranging signals transmitted by the ground station TF, are referenced TFR, ranging signals transmitted by the ground station TG are referenced TGR, interrogating signals transmitted to ground station TA by aircraft $A_1$ are referenced ITA, interrogating signals transmitted from aircraft $A_2$ to ground station TC are referenced ITC. While synchronising signals transmitted from ground station TA to aircraft $A_1$ and ground station TC to aircraft $A_2$ are referenced RTA and RTC respectively. The dashed line in FIG. 6 indicates the end of the first third of each 1000 micro second time slot.

Using timing as illustrated in FIG. 6, at 1000 time slots per second, each ground station provides 100 ranging signals per second. Thus ranging information is provided at 10 times per second and fluctuations will be reduced by $\sqrt{10}$ compared with an arrangement using timing as described with reference to FIGS. 2 to 5.

The system may now accommodate a total of 3000 aircraft and therefore the epoch could be reduced to 2 seconds if desired.

Since the accuracy of ranging in any period between synchronisation depends upon the accuracy of synchronisation, fluctuations may be further reduced if the clock accuracy in the airborne equipment is such that synchronisation information can be averaged over 10 epochs, i.e. 30 seconds.

Referring to FIG. 7, the central clock for the ground transponder station is referenced 1, this is connected to apply clock signals to a control circuit 2, which controls the timing of the various functions performed by the ground station. One connection from control circuit 2 controls the triggering of transmitter 3 at times when this is due to transmit ranging signals as previously described. Transmitter 3 is connected to the aircraft aerial 4 via a coupler 5, which is also arranged to pass interrogating signals from aircraft received by aerial 4 to a receiver 6. Output from receiver 6 is applied to a decoding circuit 7, which is arranged to recognise incoming interrogating signals from an aircraft wishing to synchronise these with the ground station.

Output from decoder 7 is applied to a timing circuit 8 which supplies a triggering signal to transmitter 3 which is independent of the triggering signal controlled thereto by control circuit 2. This triggers the transmission of a synchronising response signal to the interrogating aircraft timed as previously described, by a comparison of clock signals from clock circuit 1 derived via control circuit 2 and the time of arrival of the interrogating signal from the aircraft derived from decoder 7.

Referring to FIG. 8, the aircraft's central clock circuit is referenced 9 and output from this is connected to a control circuit 10, which controls the timing of the various functions performed by the airborne equipment. Control circuit 10 is connected to control the triggering of interrogating transmitter 11, the output of which is connected via a coupler 12 to the aircraft aerial 13. Coupler 12 is also connected to pass responses from the ground station being interrogated to a receiver 14. The output at receiver 14 is connected to a decoding circuit 15, the output of which is in turn connected to one output of a comparator 16. A second input for comparator 16 is derived from the clock circuit 9 via control circuit 10, so that any disparity between the synchronising signals received via decoder 15 from the ground station being interrogated and the timing signals from clock circuit 9 may be developed into a control signal applied via lead 17 to adjust the frequency of clock circuit 9.

Timing signals from clock circuit 9 are also passed via control circuit 10 to a range computer 18, which, by comparing these signals with signals received from the ground station via decoder 15, over lead 19, computes the range of the ground station, as known per se.

It will be noted that the detailed design of the circuits schematically illustrated by blocks in FIGS. 7 and 8 may follow conventional practice and more detailed description is not thought necessary to enable a man skilled in the art to carry the invention into effect.

I claim:

1. In a system for aiding navigation, the combination of:
    a plurality of moving craft, each including transmitter means for transmitting an interrogation signal only once and at a fixed time within a particular time slot, which fixed time establishes an epoch for each craft which may differ from a master epoch, each craft transmitting during a different time slot within the master epoch;
    at least one fixed station, including transmitter means for transmitting ranging signals at fixed times uniquely to define said master epoch and each time slot within it, and for transmitting a synchronizing signal within each time slot only in response to an interrogation signal; and
    means at each craft for adjusting the time of transmission of each interrogation signal in response to said synchronizing signal, whereby the epoch established by each craft is adjusted to coincide in time with said master epoch, there being n time slots in each epoch whereby n moving craft may associate with the system.

2. A system as claimed in claim 1 and wherein each of said ranging signals comprises a pair of pulses whose separation identifies the fixed station by which they are transmitted.

3. A system as claimed in claim 1 wherein each of said craft transmits an identifiable interrogation signal intended for a selected fixed station whereby said craft may select which of said fixed stations it utilizes to obtain time synchronizing signals, said selected fixed stations each including means responsive to said identifiable interrogation signals from said craft for transmitting time synchronizing signals to that craft.

4. A system as claimed in claim 3 wherein each identifiable interrogation signal transmitted by said craft consists of a pair of pulses, the separation of which identifies the selected fixed station for which it is intended.

5. A system as claimed in claim 3 wherein the identifiable interrogation signal transmitted by each aircraft has a frequency of transmission which identifies the station for which it is intended, different ones of said selected fixed stations being allocated different frequencies on which to operate.

6. A system as claimed in claim 5 wherein the identifiable interrogating signal transmitted by each aircraft consists of a pair of pulses the separation of which identifies the station for which it is intended.

7. A system as claimed in claim 4 wherein, in response to the receipt of said pair of pulses, each selected fixed station transmits, within the time slot allocated to the craft transmitting said pair of pulses, an identifiable synchronizing signal comprising a pair of pulses whose separation identifies said selected fixed station.

8. A system as claimed in claim 1 and wherein said craft are aircraft and said system an aircraft landing system.

9. In a navigation aiding system, the combination of:
    a relatively fixed station having a master clock associated therewith, transmitter means connected with said master clock for transmitting ranging signals at predetermined times, receiver means for receiving an interrogating signal from a craft, and means interconnecting said receiver means and said transmitter means for causing said transmitter means to transmit a time synchronizing signal at a predetermined time in advance of a second fixed reference time of the master clock equal to the time difference between a first fixed reference time of the master clock and receipt of the interrogating signal from the craft; and
    a craft-carried system including an adjustable clock to be synchronized with said master clock, craft receiver means for receiving said ranging signals and said time synchronizing signal, craft transmitter means connected with said adjustable clock for transmitting said interrogating signal at that time of said adjustable clock theoretically corresponding to said first fixed reference time, and means interconnecting said craft receiver means and said adjustable clock for adjusting said adjustable clock such that the time of receipt of said synchronizing signal is said second fixed reference time, whereby to synchronize the first and second fixed reference time, according to said adjustable clock to the corresponding fixed reference times of said master clock.

10. In a system as defined in claim 1 wherein there is a plurality of fixed stations, each transmitting ranging signals at different fixed times in said master epoch, there being a plurality of time slots interspersed between each successive pair of ranging signal transmissions.

11. In a system as defined in claim 1 wherein there is a plurality of fixed stations, each transmitting ranging signals at different fixed times in said master epoch, which different fixed times define the beginnings of said time slots.

* * * * *